(No Model.)
J. RADEMACHER & R. A. LEMON.
FLUE WELDING DEVICE.
No. 312,895. Patented Feb. 24, 1885.
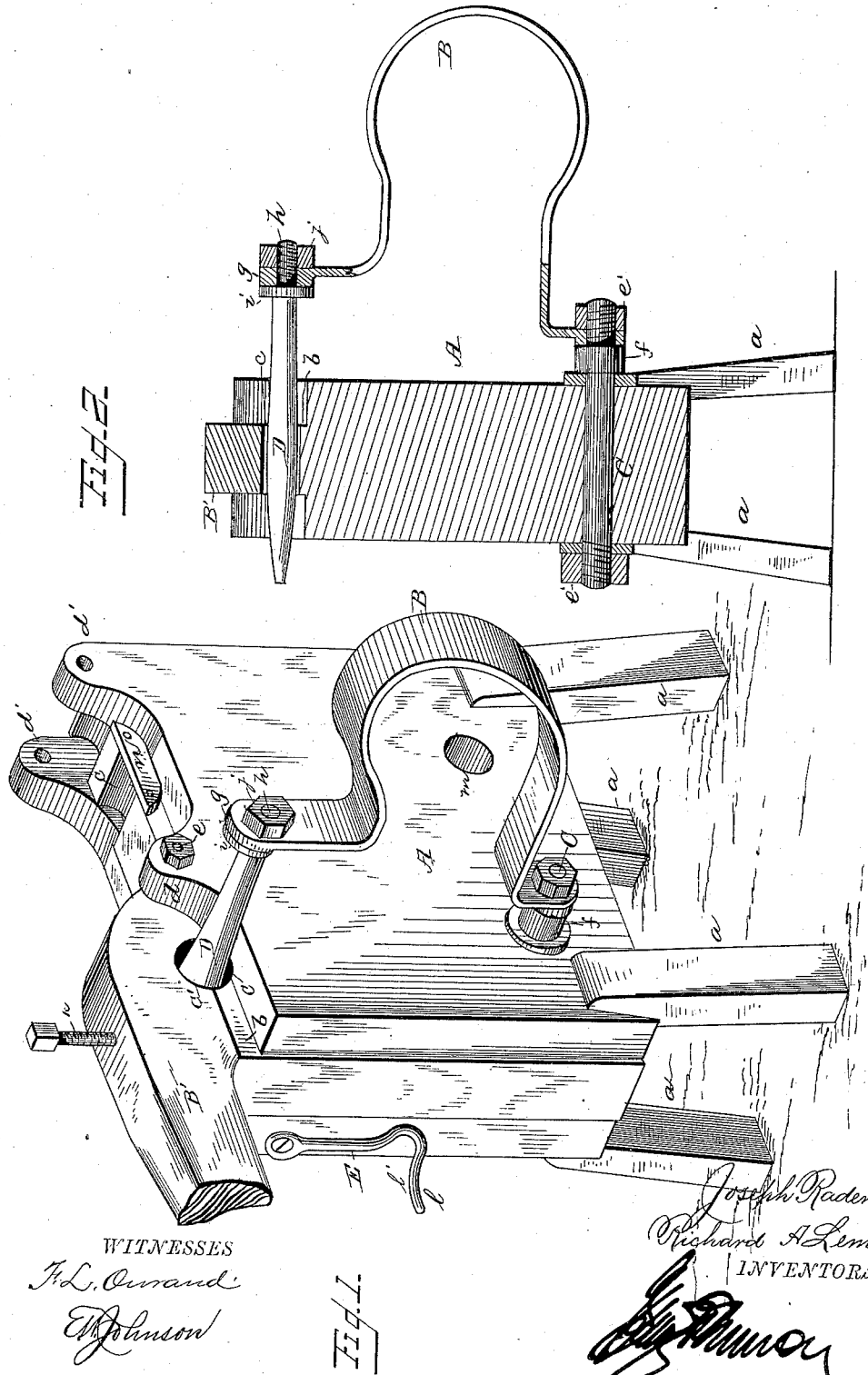
WITNESSES
F. L. Ourand
E. Johnson
Joseph Rademacher
Richard A. Lemon
INVENTORS.
Attorney

UNITED STATES PATENT OFFICE.

JOSEPH RADEMACHER AND RICHARD A. LEMON, OF CLINTON, ILLINOIS.

FLUE-WELDING DEVICE.

SPECIFICATION forming part of Letters Patent No. 312,895, dated February 24, 1885.

Application filed June 14, 1884. (No model.)

*To all whom it may concern:*

Be it known that we, JOSEPH RADEMACHER and RICHARD A. LEMON, citizens of the United States of America, residing at Clinton, in the county of De Witt and State of Illinois, have invented certain new and useful Improvements in Flue-Welders; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Our invention relates to welding-machines; and it consists in the improvements hereinafter described, whereby the end sections, that are usually welded to the ends of boiler-tubes, may be readily and effectively secured in position.

In the accompanying drawings, Figure 1 is a perspective view, and Fig. 2 a transverse central section, of a welding-machine constructed in accordance with our invention.

A indicates a vertical rectangular block, forming the body of the machine and supported in position by legs *a*. The said block A has on its upper side a central longitudinal rib, *b*, which is cut away at two points to present semicircular recesses *c*. Parallel ears *d d'* are formed on the upper side of the block A, at the middle and end thereof.

A lever, B', is pivotally secured at one end between the ears *d* by means of a bolt, *e*, and has its free end reduced to form a handle for the manipulation of said lever. The lever is cut away on its under side to form a semicircular recess, *c'*, which, when the lever is lowered to bear on the upper side of the block A, makes, in connection with the recess *c*, a complete opening.

A bent spring, B, is secured at its lower end to the lower portion of the block A by a bolt, C, which is threaded at both its extremities to receive nuts *e'*, to clamp said bolt in position in the block A. An annular shoulder, *f*, is formed integral with the bolt at one side of the block, and presents a bearing, against which the lower end of the spring is clamped. The upper end portion of the spring B is bent vertically and enlarged to form a head, *g*, which is perforated for the passage of a threaded shank, *h*, of a tapering cylindrical mandrel or expander, D, which is provided integrally near the shank *h* with a disk, *i*, against which the head *g* is clamped by the nut *j*. The tapered cylindrical mandrel D is so supported by the spring B as to pass through the opening formed by the recessed portions *c c'* of the block A and lever B', the said cylindrical mandrel being capable of rotation in the head *g*.

As is ordinarily known, boiler tubes and flues have sections welded to their extremities to strengthen their ends when they become worn or weakened. Our machine is for the purpose of welding the flue and section together. The shorter section being heated and the end of the larger section being placed in the shorter, they are then both heated for welding and passed into the opening formed by the recess *c c'*, with the cylindrical mandrel or expander passing through said shorter flue-section. The lever B' is then brought down, and by the pressure it causes effects the complete welding of the sections together.

The degree of force exerted by said lever on the tube-sections, or the size of the aperture in which they are treated, may be regulated by a thumb-screw, *k*, which passes vertically through said lever, and is adapted to project more or less from the under side of the same and limit the approach of said lever to the block A.

On the front face of the block A is pivoted a hook, E, the hook portion *l* of which is depressed, as indicated in Fig. 1, so that when the lever B' is elevated and the hook moved on its pivot the under side of the lever B' will bear upon the depressed portion *l'* of the hook E and be supported thereby.

By having the mandrel supported as described the tube-sections upon the same may be readily manipulated, as the mandrel can be rotated, as hereinbefore explained, while the spring-support of the said mandrel prevents the same and its section from becoming jammed in the recess during the operation and leaving the inside surface of the weld smooth.

The lever B' may be removed and a shorter lever clamped between the ears *d' d'* at the end of the block A. One of the nuts *e'* of the bolt C is then removed, and the said bolt-spring B and mandrel D are then removed from the position illustrated in the drawings, and the bolt C passed through an opening, m, and clamped therein, so that the mandrel D is supported and passes through the opening adjacent to the ears d'.

A metal plate, n, is bolted at the end of the recess adjacent to the ears d', and is flush with the upper face of the raised portion b of the block A. The aperture last described, minus the metal plate n, is for welding smaller flues or tubes; but when the plate n is in position the mandrel is out of said aperture, and the said plate acts as a stop for the end of the tube-sections inserted in the aperture from the opposite side of the block A, and the lever being then brought down effects the swaging or contracting of the tube, the movement of the lever being limited by contacting with the metal plate n.

We claim—

1. The combination, in a machine for welding boiler tubes and flues, of a supporting frame or body recessed upon its upper side, a lever pivoted on its upper side and recessed to form, in conjunction with the first-mentioned recess, an aperture, a cylindrical mandrel or expander passing through said aperture and connected at one end to an adjustable support secured on the side of the frame or body, and capable of rotation in said support, substantially as set forth.

2. The combination, in a machine for welding boiler tubes or flues, of a body or frame recessed at two or more points on its upper side, a recessed lever adapted to be pivotally secured adjacent to either of said recesses, for the purpose specified, said body being perforated below each of said recesses, a bolt in one of the said perforations carrying a support, and a mandrel extending through one of the apertures presented by the lever and recessed body, and secured at one end to the said support, substantially as set forth.

3. The combination, in a machine for welding boiler tubes and flues, of a supporting frame or body recessed upon its upper side, a lever pivoted on its upper side and recessed to form, in conjunction with the first-mentioned recess, an aperture, a cylindrical mandrel or expander passing through said aperture and connected at one end beyond said recess with a bent spring-support secured to the side of the frame or body and capable of rotation on said support, substantially as set forth.

4. The combination, in a machine for welding boiler tubes and flues, of a supporting frame or body, A, recessed as described, a bolt, c, passing through the same and provided with a shoulder, f, a bent spring, B, the lower end of which is clamped against said shoulder f, and provided with a head, g, at its upper end, a mandrel, D, having the disk i clamped against the head g, and pivoted lever, substantially as set forth.

5. The combination, in a machine for welding boiler tubes and flues, of a supporting frame or body, recessed as described, spring-support secured to said body carrying mandrel D, recessed lever pivoted on said body, and thumb-screw passing through the same, substantially as set forth.

6. The combination, in a machine for welding boiler tubes and flues, of a supporting frame or body, recessed as described, bent spring secured to said body, a mandrel, D, secured to said spring, a lever pivoted on the upper side of said body, and a hook pivoted on the front of said body, substantially as specified.

7. The combination, in a machine for welding boiler tubes and flues, of a supporting frame or body provided with a central rib or projection, b, recessed as described, a plate, n, secured at one end of said recess, and a lever pivoted adjacent to said recess, substantially as set forth.

In testimony whereof we affix our signatures in presence of two witnesses.

JOSEPH RADEMACHER.
RICHARD A. LEMON.

Witnesses:
WILLIAM BOOTH,
F. F. MORGAN.